United States Patent
Biradar et al.

(10) Patent No.: US 11,329,847 B1
(45) Date of Patent: May 10, 2022

(54) SCALABLE IN-BAND TELEMETRY AS A SERVICE (TAAS)

(71) Applicant: Arista Networks, Inc., Santa Clara, CA (US)

(72) Inventors: Rajshekhar Biradar, Bangalore (IN); Naveen Kumar Devaraj, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/362,985

(22) Filed: Jun. 29, 2021

(51) Int. Cl.
*G06F 15/173* (2006.01)
*H04L 13/08* (2006.01)
*H04L 43/062* (2022.01)

(52) U.S. Cl.
CPC ............ *H04L 13/08* (2013.01); *H04L 43/062* (2013.01)

(58) Field of Classification Search
CPC ............................. H04L 43/08; H04L 43/062
See application file for complete search history.

(56) References Cited

U.S. PATENT DOCUMENTS

| | | | |
|---|---|---|---|
| 2020/0028771 A1* | 1/2020 | Wong | H04L 43/067 |
| 2020/0296007 A1* | 9/2020 | Finn, II | H04L 41/145 |
| 2021/0194894 A1* | 6/2021 | Anderson | H04L 63/1425 |

* cited by examiner

*Primary Examiner* — Thanh T Nguyen
(74) *Attorney, Agent, or Firm* — Fountainhead Law Group P.C.

(57) ABSTRACT

Systems and methods for INT telemetry are disclosed. The system selects a subset of flows from a plurality of flows to monitor. Parameters of the selected flows are sent by the management controller to an INT source for creating a watchlist. The INT source analyses an incoming packet against the parameters in the watchlist to determine if the packet belongs to a flow selected for monitoring. If the packet matches any one of the parameters, then the INT source embeds the packet with an IP address of a designated tenant collector and the INT instructions. A designated collector is allocated for each flow, set of flows, or tenant. Regardless of the path taken by the packet, the embedded INT packet contains all the information needed for a downstream network element to send telemetry data without the need for configuring the network element for telemetry.

20 Claims, 8 Drawing Sheets

US 11,329,847 B1

SCALABLE IN-BAND TELEMETRY AS A SERVICE (TAAS)

CROSS REFERENCE TO RELATED APPLICATIONS

Pursuant to 35 U.S.C. § 119(a), this application is entitled to and claims the benefit of the filing date of Application No. 202021053282, filed Dec. 7, 2020 in the country of India, the content of which is incorporated herein by reference in its entirety for all purposes.

FIELD OF INVENTION

Embodiments of the present invention relate to managing telemetry components and collecting in-band telemetry data in multi-tenant networks.

BACKGROUND

In-Band network telemetry ("INT") is a framework that is used for monitoring traffic flow in a network and reporting the state of the network. It involves collecting and reporting packet related data (e.g., packet latency, jitter, packet loss rate) along the packet's path to its destination. The metadata is collected in the data plane without requiring any intervention of the control plane.

In certain settings involving multi-tenant networks, such as large cloud provider multi-tenant networks, telemetry resources are centralized. For example, a centralized collector is used in a multi-tenancy cloud network to collect and report metadata. In such architectures, the physical infrastructure is centrally controlled and largely abstracted from the tenants, leaving the tenants with little or no visibility into the health and utilization metrics of the network. As such, tenants requiring metrics, such as drop counters, buffer utilization, queue latency, are heavily dependent on the network administrators that operate the centralized resources thereby resulting in a substantial amount of back and forth communications between the tenant and the network administrators, or the central servers, making the process inefficient and cumbersome.

To add to the problem, application of traditional methods in a multi-tenant network setting may result in collection of irrelevant or non-specific telemetry data that is not useful to the tenant for troubleshooting their specific application performance issues. This is because multi-tenancy cloud networks, where a centralized collector is used, will have limited permissions and may not be able to collect specific data that is relevant to the tenants as it might contain sensitive information about the tenants' customers. Without the tenant specific data, the configurations and INT instructions developed from a broader physical infrastructure perspective may be too generic and not address the specific concerns of the tenant. As such, the telemetry data collected in response to such broad and generic instructions is also not specific to the tenant's needs.

For example, identifying packet drops in the network can be challenging for tenants, especially when trying to pinpoint a network element at which the packets are being dropped for a specific traffic flow. Specific configurations and INT instruction would need to be applied to network elements in order to collect such specific telemetry data that would help identify the network element where the packets are dropped. Since the tenants are not given permission to customize configurations and INT instructions, they do not have the ability to collect data that is specific and relevant to them, thereby further increasing their dependence on the physical infrastructure teams to make changes.

An attempt to deviate from the common centralized collector approach and use a per-flow or per-tenant collector approach presents new challenges. For example, a large network consists of numerous flows and tenants. Each flow encounters several network elements along its path to its destination. To adequately address the scale of telemetry metadata that is to be collected from each network element, a large number of collectors are required. A lesser number of collectors would overburden the collectors to process the massive amount of metadata that needs to be processed by them. As such, the number of collectors in a network is commensurate with the scale of the network and the topology and designed such that each collector can accommodate a digestible amount of telemetry metadata. This results in collectors being designated on a per-flow or per-tenant basis such that telemetry metadata for a specific flow, or a specific tenant, would be collected by its designated collector. Although the solution with per-flow/per-tenant collector solves some problems faced in the common centralized collector approach, it presents scalability challenges when collectors are designated on a per-flow or per-tenant basis. For example, watchlist and per-flow or per-tenant collector mapping on network elements takes up large amount of hardware resources making it harder to scale. As such there is a need for a solution to address scalability challenges in a per-flow or per-tenant telemetry environment.

Yet another problem with a large network having multiple collectors on a per-flow or per-tenant basis is that the IP address of the each collector and the watchlist to collector mapping needs to be configured on all the network elements in the network, or at least on all the network elements in the path of the packet to its destination. Configuring each network element is thus required in these systems to allow reporting of telemetry as well as to optimize, for example, the usage of hardware resources like TCAM that is used to store the watchlist to collector mapping information. As such, this approach is inefficient as it requires manual configuration of the network elements, adds management overhead, is resource intensive, and adds latency when there is a need to update network element configurations for keeping up with changes in traffic flow.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
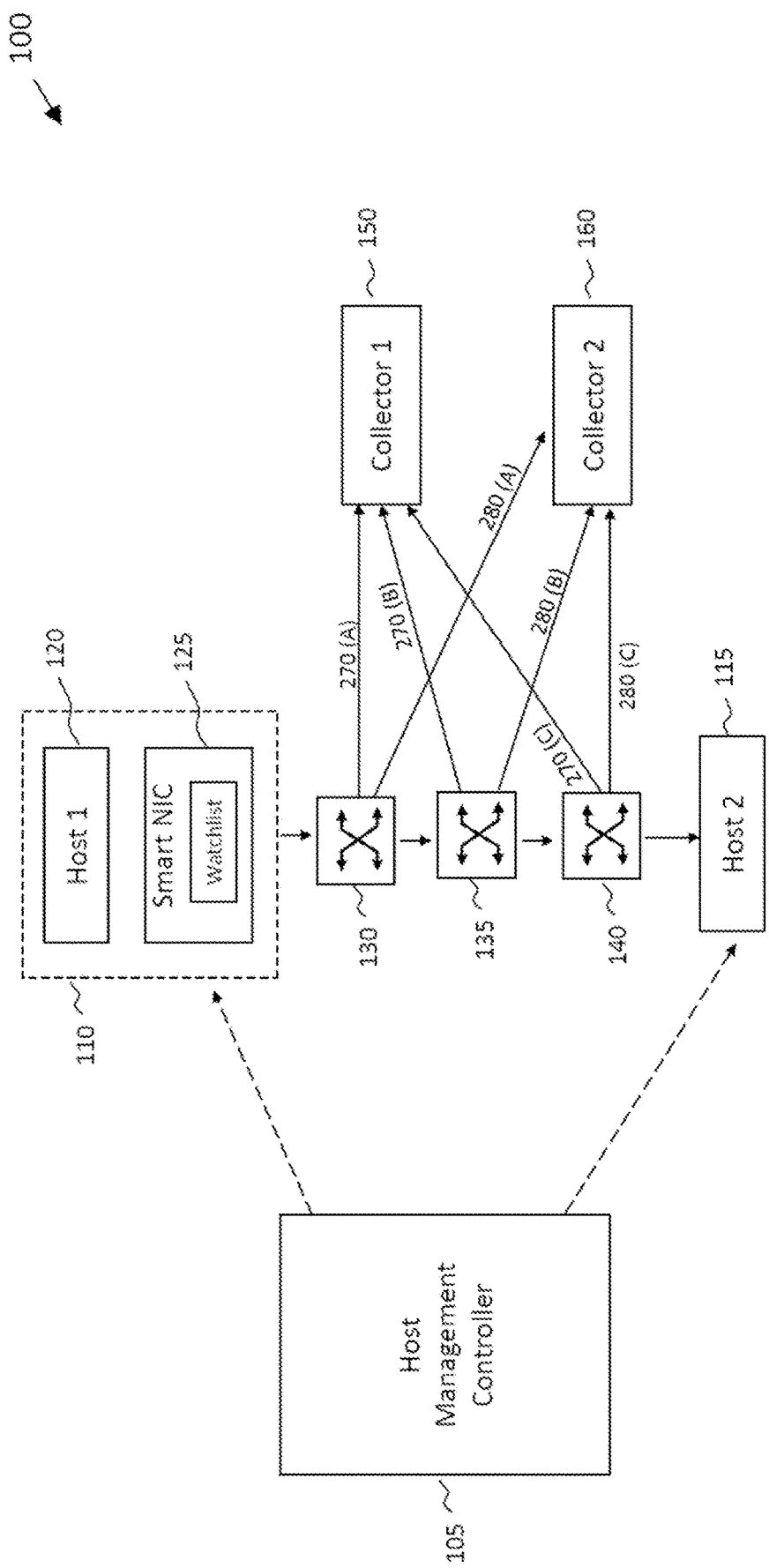
FIG. 1 is a block diagram of a system for in-band telemetry in a multi-tenant network, in accordance with some embodiments of the disclosure.

In accordance with some disclosed embodiments, systems and methods for managing telemetry components and collecting in-band telemetry data in multi-tenant networks are disclosed.

In accordance with some embodiments disclosed herein, the above-mentioned limitations are overcome by using a designated collector (also referred to as localized collector) for each tenant, or each flow or set of flows, such that there is no dependency on a centralized collector. Such embodiments provide a packet embedding method that alleviates not only the need to configure each network element along the path with the central collector's IP address but also the need to configure the network element on a per-flow or per-tenant collector IP address.

Instead of configuring each network element with a per-flow or per-tenant collector IP address, and then having to repeat the process for an entirely new set of flows or tenants, some of the disclosed provide an INT source that embeds each packet header with the designated collector IP address (also referred to as the tenant collector IP address) and INT instructions. In various embodiments, the INT source is the first element in the tenant that embeds the packet. Alternatively, the INT source can be any network element along the path of the packet. As the packet follows its normal path, regardless of the path chosen, the embedded header and INT instructions are used by each network element encountered along its path to take action based on the INT instructions and send telemetry data that matches the INT instructions to the designated collector. The embedded header and INT instructions thereby allow collection of metadata without the need to configure each network element on a per-flow or per-tenant basis.

To accomplish the above-mentioned approach, in accordance with some disclosed methods and embodiments, a system comprising a management controller, a host, an INT source, a plurality of network elements, a plurality of designated tenant collectors, and a plurality of end hosts or receiver are used. The management controller varies depending on the architecture used. For example, a host management controller is used if the architecture includes a smart NIC as an INT source or a network management controller is used if the architecture uses the first network element as an INT source.

In one embodiment, the method involves the use of a management controller (host management controller or network management controller) in a multi-tenant in-band telemetry (INT) capable network. The management controller receives flow parameters, also referred to as the parameters, for a desired flow that is of interest to be monitored. The desired flow is one of the flows that is preselected from a plurality of flows in the network. The management controller provides the parameters of the desired flow, which include source/destination IP, source/destination port number, protocol (also referred to as 5-tuple), other metrics and parameters, and corresponding collector IP address for each flow, set of flows, or each tenant, to the INT source.

The management controller identifies a first INT source based on the received packet flow parameters. The first INT source is the header source responsible for embedding packet headers and preparing the packet for INT telemetry. It may be the first switch, hypervisor, or a smart (NIC) network interface card. Details of the INT source to be used, along with its IP address, is received as part of the parameters received from the management controller.

The management controller configures the first INT source such that it is capable of embedding packets with a first tenant collector's IP address and a microcode (also referred to as INT instructions). The management controller provides parameters and per-flow/per-tenant collector IP address to the INT source. The provided collector IP address is used by the INT source and embedded into the header of an incoming packet such that as the packet travels along its path, regardless of the path taken, the embedded collector IP address is used by downstream network elements for sending the collected telemetry data.

Once the INT source is configured, it is ready to embed the packet header of the received packets. The INT source also maintains a watchlist of desired flows. The watchlist is created from the parameters supplied by the management controller and stored in the memory of the INT source. Since there may be several flows in the network, the watchlist includes a subset of flows that are preselected for monitoring. The watchlist stores the 5-tuple information, as well as information relating to any other parameters provided, which includes source/destination IP, source/destination port number, and protocol among other parameters. It also stores flow to designated collector or tenant to designated collector mapping that associates a specific collector for each flow, set of flows or tenant.

A configured INT source, such as the first INT source, receives a packet and determines if the packet matches any one of the 5-tuples, such as the destination IP address, of the desired flow stored in the watchlist. The matching confirms that the packet received belongs to the desired packet flow that was preselected for monitoring. In response to determining a match with the watchlist, the first INT source embeds the packet header with a) the IP address of the first collector and b) a set of INT instructions. In the event the packet does not match any one of the 5-tuples stored in the watchlist, the packet is forwarded without being embedded with first collector IP address and INT instructions. Since the watchlist may contain more than one desired flow, the watchlist stores separate 5-tuples parameters and flow to collector or tenant to collector mapping for each flow. As such, each flow, set of flows, or tenant has a specific designated collector. The flow to collector or tenant to collector mapping in the watchlist is used to determine which collector address is to be embedded in the packet header.

Additionally, once a match with the watchlist is determined, the first INT source inserts a set of INT instructions into the header of the incoming packet. The INT instructions provide guidance on the telemetry data to obtain from each downstream network element encountered along the packet's path to its destination. Examples of telemetry data to be collected include packet latency, jitter, packet loss rate, and bandwidth utilization. The network element receiving the packet decodes the INT instructions and follows the instructions to copy the instructed telemetry data and send it to the designated collector, such as the first or second collector as provided by the INT instructions.

The embodiments described eliminate the need to configure each network element with a collector IP address to obtain telemetry data. The INT instructions included in the embedded packet instruct each downstream network element for the type of telemetry data to collect and send to the designated collector. Additionally, routing changes are easily accommodated as the packet itself holds the key to obtaining the telemetry data regardless of the path it follows, or the path changes that occur along the way. The network elements encountered along the path are instructed to take action, i.e., collect and report the telemetry data, solely on the basis of the embedded INT instructions thereby removing the burden of initially configuring network elements for telemetry and then reconfiguring them based on routing changes. As such, the embodiments allow full control of managing telemetry data without the need to configure networking elements for telemetry. Further, if any changes to type of telemetry data collected are made, such as original INT instructions calling for collection of telemetry data relating to congestion and then a switch to desiring collection of telemetry data related to jitter, then the update can be performed simply at the INT source by embedding a new INT header for the next step of incoming packets that includes INT instructions that guide collection of jitter related telemetry data instead of congestion related telemetry data.

The embodiments described also allow scaling of per-tenant per-flow telemetry solution without using any additional resources on the network devices or having to configure flow-match-action statements on each network element. For example, the embodiments minimize usage of network element resources and processing power since it does not require each network element to perform flow-match-action statement analysis for each packet received. In comparison, in traditional networks where each network element is manually configured for INT, the network element must evaluate each incoming packet with the configured INT rules to determine whether the incoming packet matches the flow-match-action statements maintained by the network element. Telemetry data from packets received by network elements are sent to the central collector only if they match the flow-match-action statements. Performing the flow-match-action statement comparison for each packet requires each network element to use a large amount of its resources and processing power.

Unlike the traditional systems, the embodiments alleviate the need to configure the network element and utilize its resources. The embedded packet includes all the instructions required by the network element to send telemetry data to the designated collector without having to maintain flow-match-action statements and perform per packet processing.

FIG. 1 shows a system 200 for in-band telemetry in a multi-tenant network, in accordance with some embodiments of the disclosure. The system 200 includes a host management controller 105, a host module 110, a receiving host 115, a plurality of network elements 130-140, and a plurality of collectors 150-160. The components of the system 200 are connected to each other through a network (not shown). Although a certain topology and number of components are shown in system 200, the system 200 may include a combination of other devices and components as well. For example, the system may include an edge element, a hub, or other network elements, servers or devices that are connected to the components shown through the network.

The network used by system 200 can be a wired or wireless network. It may be a local area network, wide area network, a virtual private network, or another type of network that provides the capability to receive and forward packets, collect and report packet and telemetry data. Network may also be an Ethernet connection. The components of the network may connect to each other through a variety of means (e.g., through an interface such as RS-232 or other wired, wireless, and digital or analog means).

The host management controller 105 identifies the end hosts, such as hosts 110 (or 125) and 115 for the interested traffic flow(s) for every tenant and programs the smart NIC 125 to add an INT header with collector IP address embedded in the INT header itself along with the microcode/INT instructions that indicate what telemetry data to collect and where to send the collected telemetry data.

The host module 110 includes a host 120 and a smart NIC 125. Although the host 120 and Smart NIC are shown as one module 110 in the current embodiment, alternative embodiments may include the host 120 as a separate device that is connected to the Smart NIC 125 as a separate device through the network.

The host 120, also referred to as the INT source or INT header source may be a computer, mobile device, or other electronic device capable of connecting to the components of system 200 through the network. The host 120 is a device that receives packets from originating sources of traffic, such as a database or a web browser. When acting as an INT source, or INT header source, the host 120 functions to embed packets received from other originating sources with an INT header. Alternatively, in some instances, the host 120 may be both an originating source of data as well as an INT source that embeds the packet for INT telemetry.

The Smart Network Interface Card (NIC) 125 is a network interface card that connects with the host 120 and the host management controller 105 to enable connectivity to the network. It also implements network traffic processing and offloads certain processing that may have been performed by a CPU of host 120. As mentioned above, the Smart NIC 125 may be an independent device or part of the host module 110. When acting as a separate device, the Smart NIC 125 takes the role of the INT source, or INT header source, and functions to embed packets received from other originating sources with an INT header. Although a host 120 and Smart NIC 125 are described above as INT or INT header sources, the invention is not so limited and includes other devices such as hypervisors, ToRs, and other devices capable of receiving packets and embedding packet headers for INT telemetry.

In one embodiment, the Smart NIC includes a watchlist. The watchlist is a list of desired flows that are of interest. In one embodiment, the watchlist is created by a network administrator and provided to the host management controller 105 and then in turn from the host management controller 105 to the INT source (i.e. either the host module 110 or the Smart NIC 125). The NIC creates the watchlist from the parameters supplied by the management controller and stores it in the memory of the INT source. Since there may be several flows in the network, the watchlist includes a subset of flows that are preselected, such as by the network administrator, for monitoring. The watchlist stores 5-tuple information, which includes source/destination IP, source/destination port number, and protocol as well as a flow to designated collector or tenant to designated collector mapping. It may also store additional details for each flow.

The system includes a plurality of network elements 130-140. Although three network elements are shown, and routes between the network elements are depicted, the system 200 for collecting packet flow data and configuring a network element is not so limited. It is understood that other types of network topologies that include different combination of network elements and links, e.g., greater or fewer number of network elements, subnets, routers, and switches than shown in FIG. 1, may be employed to collect packet telemetry data and report it to designated collectors.

The first network element 130 may act as the ingress point or the first hop for a packet that is sent from either the host module 110 or the Smart NIC 125 (when the Smart NIC is acting as a separate device). The first network element 130 can be a switch, router, hub, bridge, gateway, or even a virtual machine, or other types of packet-forwarding device that can communicate with other components of the network.

Likewise, other network elements 135 and 140 can also be a switch, router, hub, bridge, gateway, virtual machine or other types of packet receiving and forwarding devices. Each network element is programmed to monitor the incoming packets with an INT header. Once, switch receives the packet with INT header, it parses the INT instructions and collector IP address embedded in the INT header. Based on the INT instructions, it collects the telemetry data and sends it to the collector using the IP address provided in the INT header. The telemetry data collected can be path information, latency information, jitter, bandwidth utilization, queue depth, and other packet related data The plurality network elements 130-140 are connected through the network. The last network element 140 (the last hop before receiving host 115) may act as a sink and is capable of removing INT header and forwarding the packet to the host receiver 115.

The system also includes a plurality of collectors 150-160. The collectors 150 and 160 are designated tenant collectors. Each flow, set of flows, tenant, or a combination thereof, may have their own collector(s) that is independent from any centralized collector in a multi-tenant network. Having designated collectors alleviates security and debugging concerns and provides several advantages.

Figure 2:
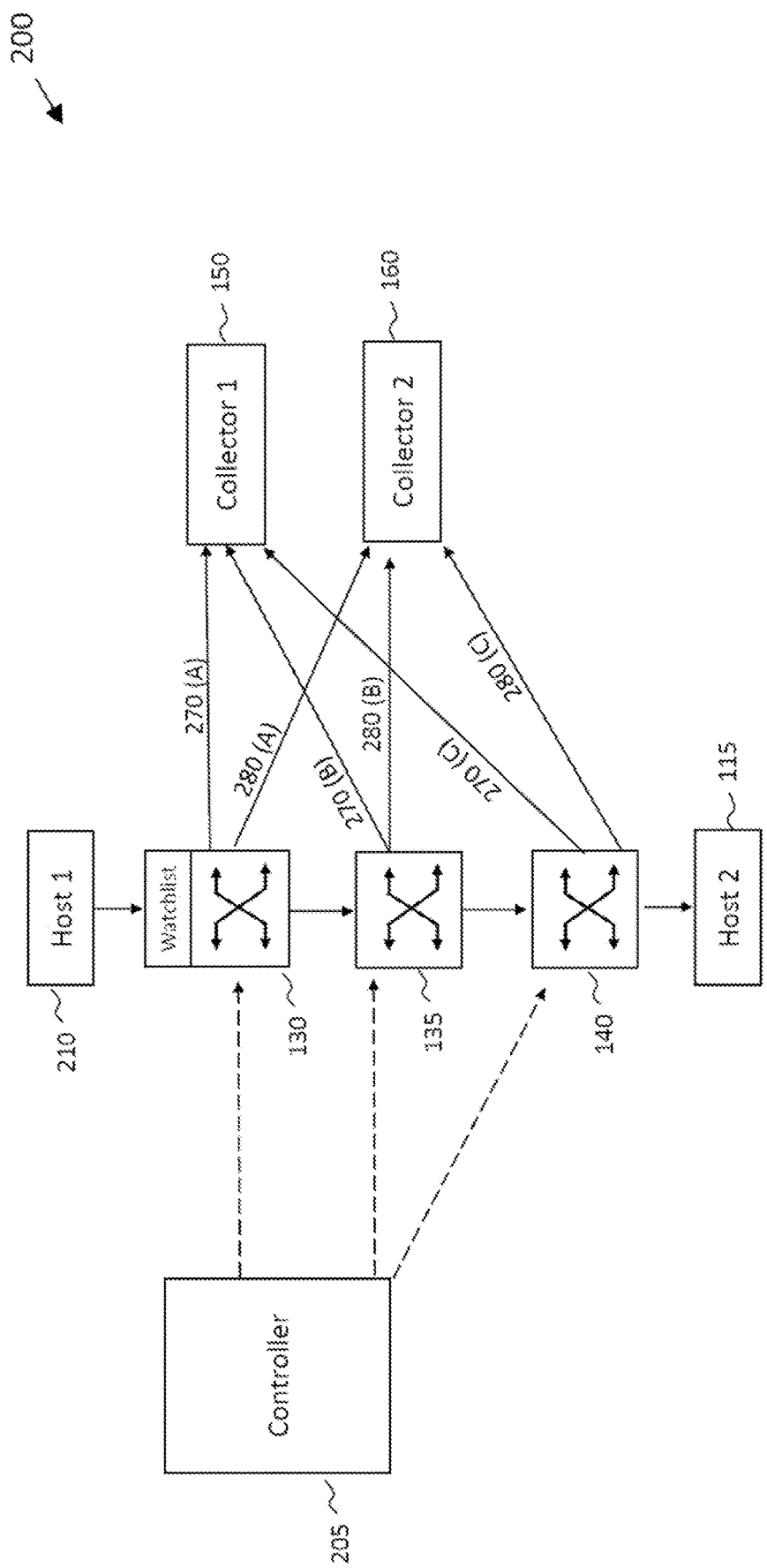
FIG. 2 is another block diagram of a system for in-band telemetry in a multi-tenant network, in accordance with some embodiments of the disclosure.

For example, in a designated tenant collector configuration, such as depicted in FIGS. 1 and 2, applications may host sensitive and confidential customer data. Decentralizing from the centralized collector and having a designated tenant collector allows sensitive data to stay within the local tenant environment without having to share it with the centralized server. The designated/localized collector approach also protects sensitive data with an added layer of security and gives more autonomy and flexibility to use the data and develop customized solutions.

In another example, having a designated collector also promotes faster debugging of network issues. In one embodiment, a customer can set their laptop IP address as collector IP address and get the stream of packets from all the network elements to their laptop for troubleshooting network problems without using complex configurations or depending on the physical infrastructure of a centralized architecture.

Additionally, having multiple collectors, where each collector is designated to a specific flow, set of flows, tenant, or a combination thereof, allows collection of metrics at different INT target collection points. For example, Flow-1 can send INT telemetry metrics related to Flow-1 to Collector-1 (150), i.e., telemetry data related to Flow-1 from network element 130 will be sent to Collector-1 (150) through link 270 (A), from network element 135 will be sent to Collector-1 (150) through link 270 (B), and from network element 140 will be sent to Collector-1 (150) through link 270 (C). Likewise, telemetry data associated with Flow-2 will be sent to Collector-2, i.e., telemetry data related to Flow-2 from network element 130 will be sent to Collector-2 (160) through link 280 (A), from network element 135 will be sent to Collector-2 (160) through link 280 (B), and from network element 140 will be sent to Collector-2 (160) through link 280 (C). The separation of per-flow (or set of flows or tenant) collectors allows flexibility in network management and troubleshooting on a per-flow or per-tenant basis.

Either collector 150 or 160 may act as a designated collector for receiving telemetry data from network elements 130-140. For example, network elements 130, 135, and 140 that fall along the path of a specific flow that has been assigned a designated collector, such as Collector 1 (150), will collect INT telemetry data from packets received and each network element will report the INT telemetry data to collector 150. Further details of the INT telemetry data collection and reporting process by a network element is described in FIGS. 4 and 7 below.

The collector IP address and flow to collector or tenant to collector mapping for each flow, set of flows, tenant, or a combination thereof, is stored in the watchlist 125. The management controller 105 receives these details from a user or a network administrator and provides them to the INT source that in turn places the information in the watchlist.

The receiving host 115, may be a receiver or destination of the INT packet. It may also be a switch, router, hub, bridge, gateway, virtual engine or other type of packet receiving device that can communicate with other components of system 100 through the network.

FIG. 2 is another block diagram of a system 200 for embedding packets for INT telemetry, in accordance with some embodiments of the disclosure. System 200 includes a controller 205, also referred to as a network controller, a host 210, a receiving host 115, a plurality of network elements 130-140, which includes a first network element 130, and a plurality of collectors 150-160. The components of the system 200 are connected to each other through a network (not shown). Although a certain topology and number of components are shown in system 200, the system 200 may include a combination of other devices and components as well.

In this embodiment, the controller 205 identifies network element 130, also referred to as ToR, and selects it as the INT source. Network element 130 may be the first network element or alternatively another network element along the packet's path. In one embodiment, the controller 205 uses MAC/ARP tables to identify the first network element. In another embodiment, the network administrator provides the IP address of the first network element 130 to the controller 205 and indicates that the first network element 205 should be selected as the INT source. The controller 205, based on the IP address provided, then selects the first network element 130, instead of the Smart NIC 125 in FIG. 1, to provide the functions of an INT source, or INT header source, and embed packets received from originating sources, or from host 210, with an INT header. Alternatively, in yet another embodiment, the first network element 130 within the local area network which is the first entry point for packets within the local area network, is selected by the controller 205 to be the INT source that embed packets with an INT header.

The first network element 130 is the ingress point or the first hop for a packet that is sent from host 210. The first network element 130 can be a switch, router, hub, bridge, gateway, or even a virtual machine, or other types of packet-forwarding device that can communicate with other components of the network.

In this embodiment, the first network element 130 includes a watchlist. As mentioned earlier, the watchlist is a list of desired flows that are of interest to be monitored. The parameters of the watchlist are provided by a network administrator to the controller 205 and then in turn from the controller 205 to the first network element 130, which is the INT source in this embodiment.

The first network element 130 uses the provided parameters to create the watchlist. The parameters include source/destination IP, source/destination port number, and protocol, collectively also referred to as 5-tuple. The controller 205 also provides details of the designated collectors along with their IP addresses and this information is used by the first network element 130 to map and store flow to collector or tenant to collector mapping for each flow, set of flows, tenant, or a combination thereof.

The first network element 130, the INT source in this embodiment, is connected to other components of system 200 through the network. Once the first network element 130 embeds an incoming packet with the collector IP address and INT instructions on the type and quantity of metadata to collect, the packet travels to next hops 135 and 140. The telemetry data collected from the next hops 135 and 140 is sent to either collector 1 (150) through links 270A-C or collector 2 (160) through links 280 A-C depending on the collector IP addresses embedded by the first network element 130 into the header of an incoming packet.

Figure 3:
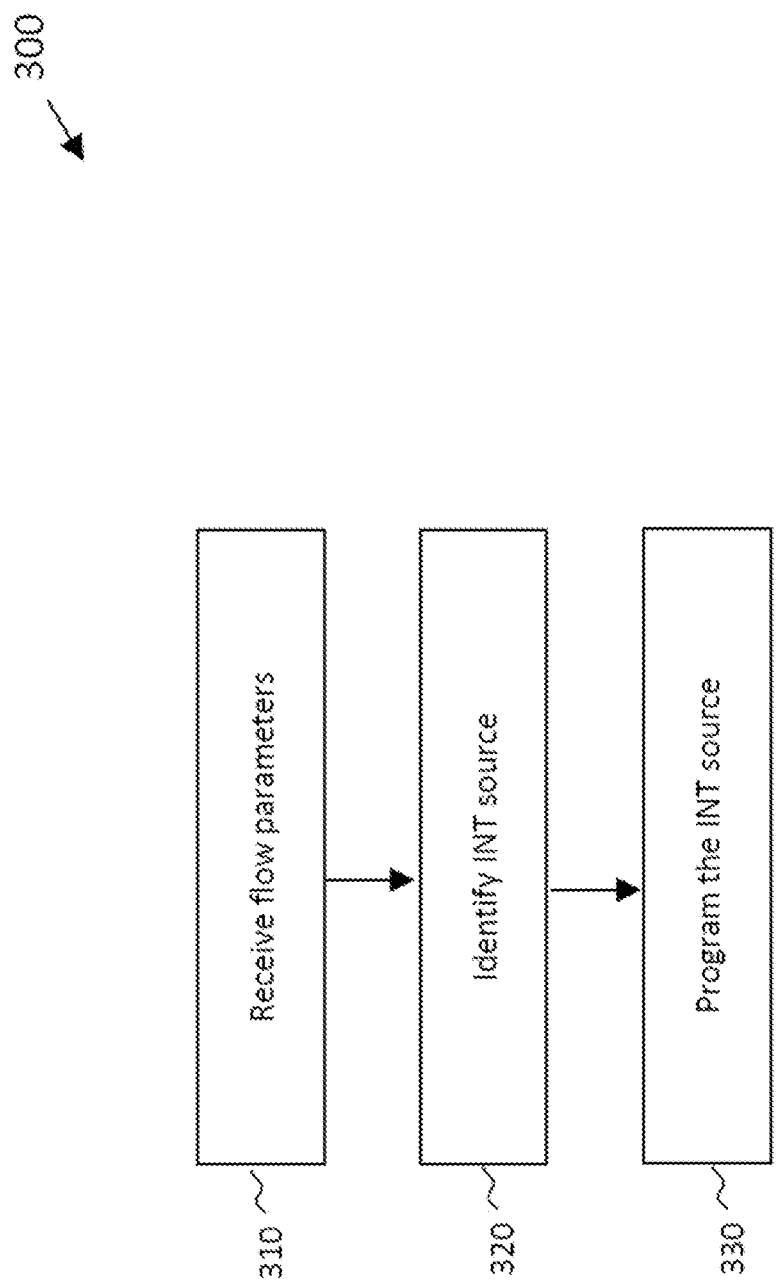
FIG. 3 is a flowchart for identifying and programming an INT source, in accordance with some embodiments of the disclosure.

FIG. 3 is a flowchart for identifying and programming an INT source, in accordance with some embodiments of the disclosure. Process 300 is performed by the system 100 as described in FIG. 1. The process 300 may also be performed by a control circuitry and systems as described in FIG. 8 below.

At step 310, the host management controller 105 receives flow parameters. These parameters are sent to the host management controller 105 by a network administrator and represent a flow (or set of flows) that are of interest and are to be monitored. For example, if the network in a company includes flows for a plurality of departments, a network administrator in Human Resources (HR) may be interested in certain traffic flow that relates directly to HR and as such may provide parameters for HR relevant flows to the host management controller 105.

The parameters received by the management controller 105 may include source/destination IP address, source/destination port number, and protocol, collectively referred to as 5-tuple. Additionally, the parameters may also include one or more collector IP addresses and a mapping for each flow, set of flows, or each tenant, to the collector IP. Parameters may also include VXLAN ID, VTEP IP, MAC addresses or other information and metrics that may be helpful in managing telemetry operations.

At Step 320, the management controller 105 identifies both end hosts, such as the host module 110 or Smart NIC 125 and the receiving host 115. Since the parameters of interested flows are provided in the 5-tuple and other parameters stored in the watchlist, the management controller 105 uses these parameters to identify the INT source.

As mentioned above, the INT source, which is the source for embedding a packet header with the collector IP address into incoming packets, may be the first switch, hypervisor, or a smart (NIC) network interface card. The INT source may be a single module 110 with the host 120 and the Smart NIC 125 housed within one device or may be separate devices for host 120 and Smart NIC 125. In either case, the management controller 105 identifies and selects the INT source for use in process 300.

Figure 6:
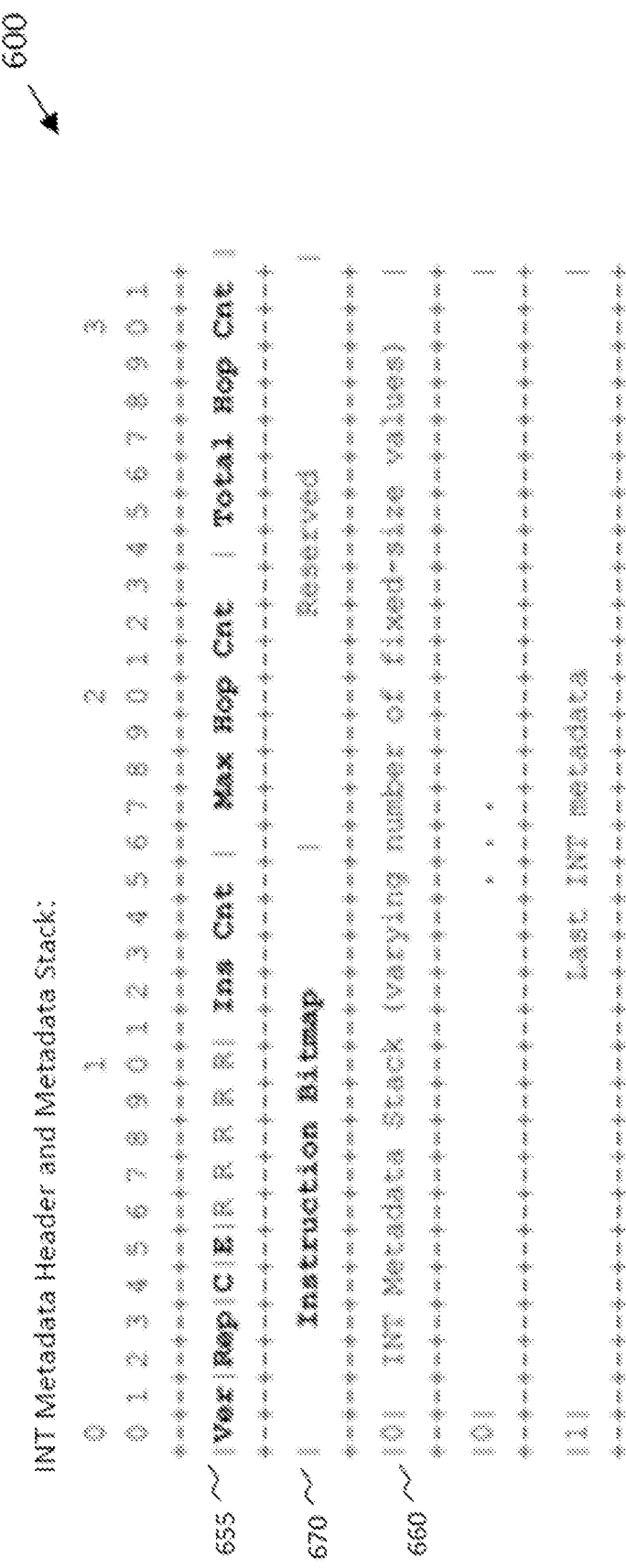
FIG. 6 is an exemplary INT header, in accordance with some embodiments of the disclosure.

At Step 330, the management controller 105 programs the selected INT source 125. The programming allows the INT source 125 to a) embed the incoming packet's header with collector IP address and b) embed the incoming packet's header with a microcode, also known as INT instructions. An exemplary packet with INT header is shown in FIG. 6.

The collector IP address from the embedded packet is used by a downstream network element to send telemetry data to the embedded collector IP address and the INT instructions indicate what telemetry data to collect and send to the designated collector, i.e., the collector whose IP address is embedded in the packet header. In one embodiment, the management controller 105 programs the Smart NIC 125. In another embodiment, the management controller 105 programs the host module 110 when the Smart NIC 125 is part of the host module 110.

In another embodiment, the process 300 can be performed by the system 200 as described in FIG. 2. The steps 310-330 are performed in the same manner, however, instead of a management controller 105, a network controller 205 is used. In this embodiment, instead of a Smart NIC, the first network element 130 (ToR) is used as an INT source. In one embodiment, the user or network administrator provides the IP address of the first network element 130 to the controller 205 and indicates that the first network element 205 should be selected as the INT source. In another embodiment the first network element 130 within the local area network, which is the first entry point for packets in the local area network, is selected by the network controller 205 to be the INT source. In yet another embodiment, the controller 205 uses MAC/ARP tables to identify the first network element. Network controller 205 programs the first network element 130 such that the first network element 130 can embed incoming packets with collector IP address and INT instructions.

Figure 4:
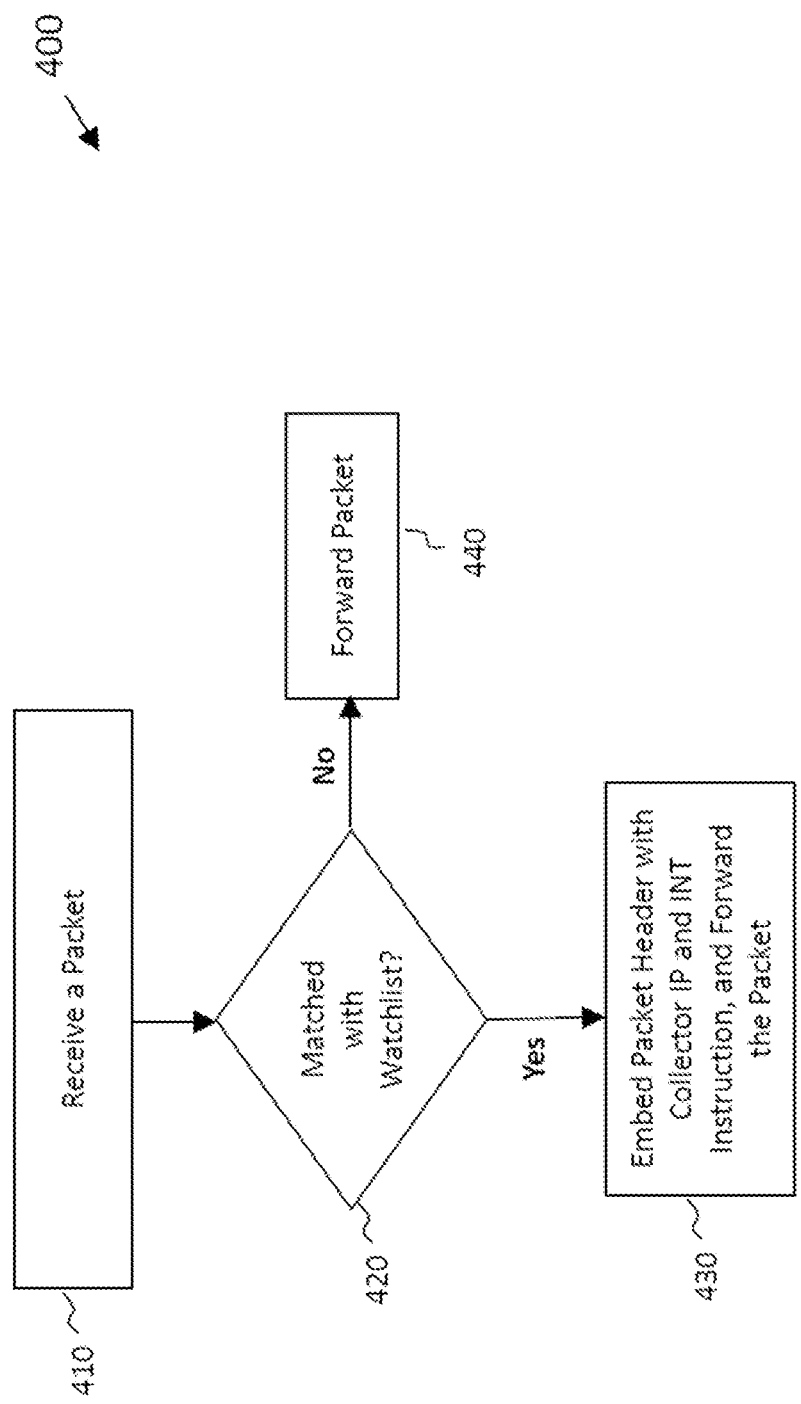
FIG. 4 is a flowchart of embedding packets for collection of INT telemetry data, in accordance with some embodiments of the disclosure.

FIG. 4 is a flowchart of embedding packets for collection of INT telemetry data, in accordance with some embodiments of the disclosure. Process 400 is performed by the system 100 as described in FIG. 1 or by system 200 as described in FIG. 2. The process 400 may also be performed by a control circuitry and systems as described in FIG. 8 below.

At Step 410, the INT source receives a packet. In one embodiment, as depicted in FIG. 1, the INT source (Smart NIC 125) may either be part of the host module 110 or be a separate device. Also as depicted in FIG. 2, the INT source may be the first network element 130.

The packet may originate through an originating source that is outside of the system 100 and 200 or it may be a packet that originates from the system 100 or 200. In one embodiment, the packet is originated from outside the system 100 or 200 and received by the INT source 125 in FIG. 1 or 130 in FIG. 2.

At Step 420, a determination is made whether the received packet is part of a flow that is of interest to be monitored. As such the packet is compared with any one or more parameters, such as the 5-tuple parameters of interested flows stored in the watchlist. These parameters include source/destination IP, source/destination port number, and protocol.

If any one of the 5-tuple parameters, or any other parameter stored in the watchlist, match the received packet, then a determination is made that the incoming packet belongs to one of the flows that has been previously identified as a flow of interest to be monitored. As a result, at Step 430, in response to a positive determination, the INT source embeds the packet header with collector IP address and INT instructions, as shown below in FIG. 5, and forwards the packet to the next hop.

If none of the parameters from the watchlist match the received packet, then a determination is made that the incoming packet does not belong to one of the flows that has been previously identified as a flow of interest to be monitored. As a result, at Step 440, in response to a negative determination, the packet is forwarded without embedding it for INT.

Figure 5:
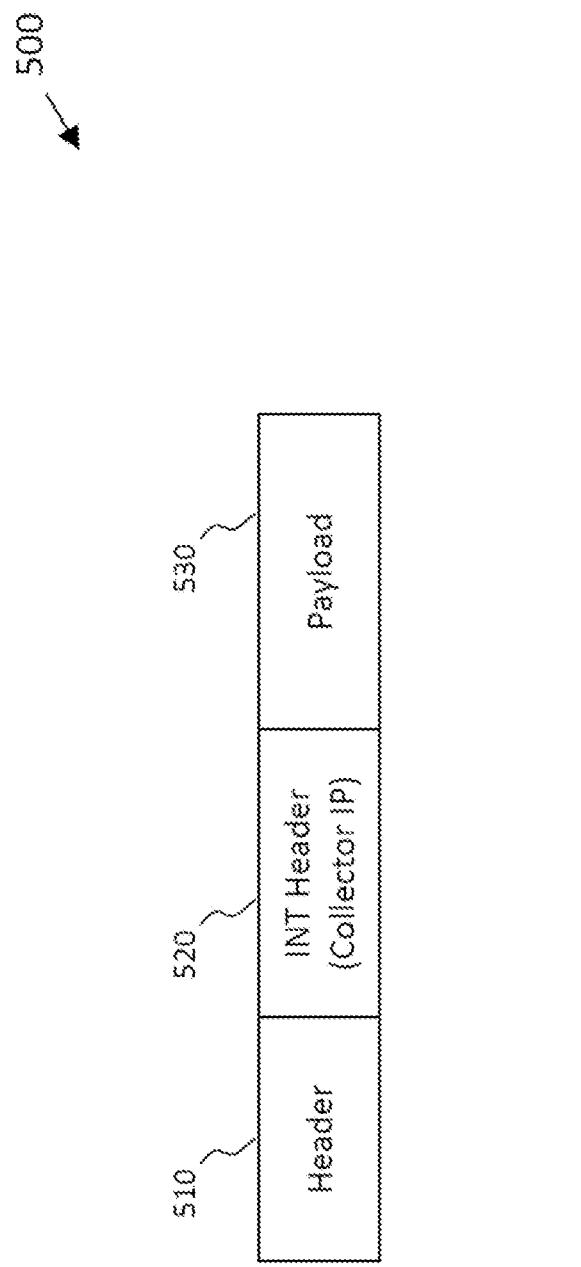
FIG. 5 is a block diagram of a packet having an INT header, in accordance with some embodiments of the disclosure.

FIG. 5 is a block diagram of a packet having an INT header, in accordance with some embodiments of the disclosure. Packet 500 includes a header 510, an INT header 520 (as shown in FIG. 6), and payload 530. The header 510 includes standard packet information such as described in standards RFC 791 (for an IPv4 packet) and RFC 2460 (for an IPv6 packet).

The INT header 520 is embedded by the INT source with the IP address of the collector that has been designated for the flow being monitored. The INT source obtains the flow to collector mapping from the watchlist and embeds the packet INT header 520 with the collector that corresponds to the flow. The INT instructions are also embedded in the INT header 520 portion of the packet header.

FIG. 6 is an exemplary packet that includes an INT header 600, in accordance with some embodiments of the disclosure. The INT metadata header is 8 bit long and metadata values are encoded as 4-bit long values. The metadata stack 660 following the INT metadata header 655 has a varying length and accommodates metadata from each hop/network element traversed by the packet. The INT instructions 670 are encoded in a 16-bit INT Instruction field where they instruct specifically what metadata is to be collected from each network element.

Figure 7:
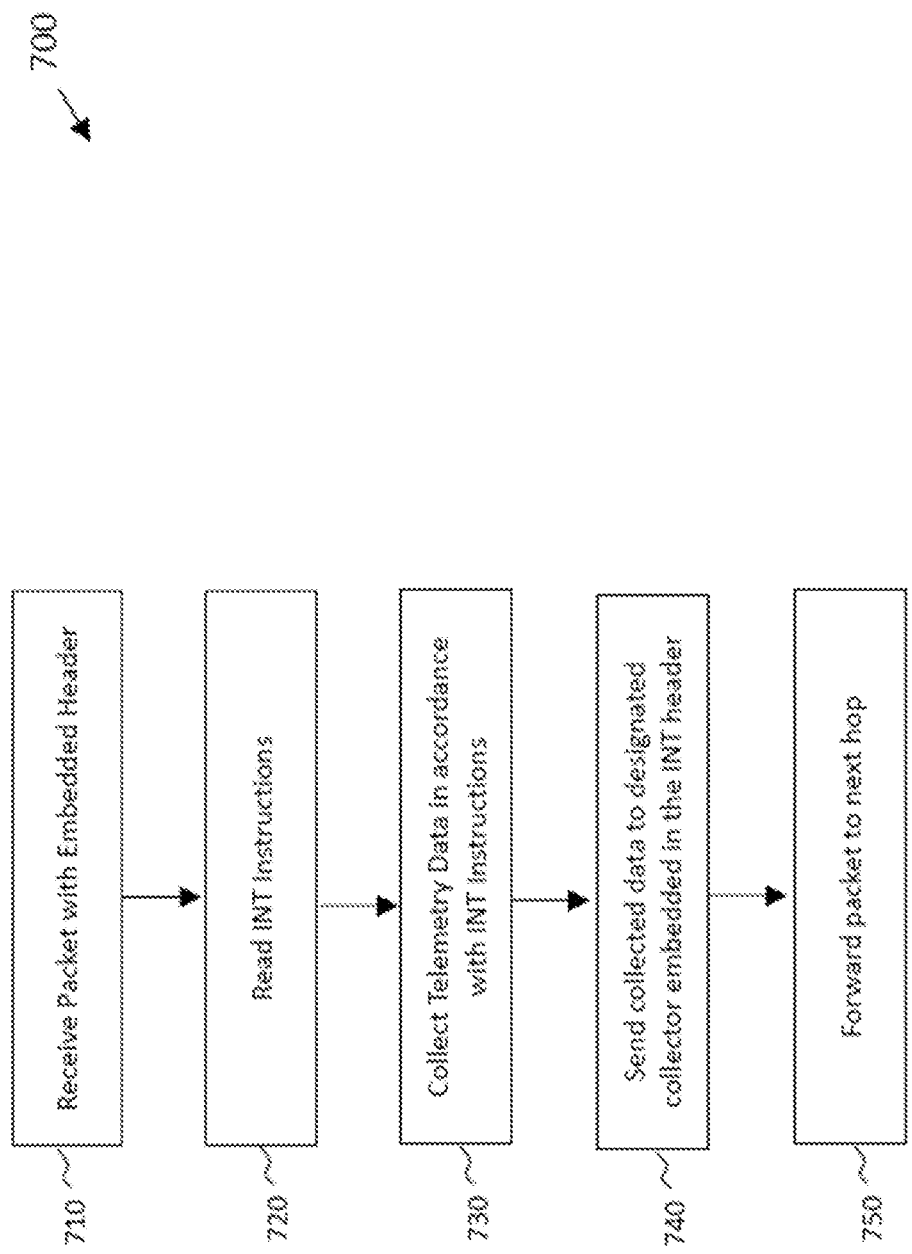
FIG. 7 is a flowchart of process used by a network element to collect and send INT telemetry data to a collector, in accordance with some embodiments of the disclosure.

FIG. 7 is a flowchart of a network element processing an INT packet and sending INT telemetry data to a collector, in accordance with some embodiments of the disclosure. Process 700 is performed by system 100 as described in FIG. 1 or by system 200 as described in FIG. 2.

Once a packet is instrumented for INT telemetry by the INT source, by embedding its header, the packet is forwarded to its next hop. In FIG. 1, the next hops after the INT source are network elements 130, 135 and 140 and in FIG. 2 they are 135 and 140.

Referring to FIG. 2, at step 710, the packet with the INT embedded header and collector IP address is received at the next hop 130. At step 720, the network element 130 reads the INT instructions that are embedded in the packet header, such as INT header section 520 in FIG. 5.

At Step 730, in accordance with, and as directed by, the INT instructions, the network element 130 collects telemetry data relating to the received packet. The telemetry data may include metrics relating to jitter, packet loss, latency, queue length, bandwidth utilization and other desired metrics as instructed to be collected.

Packet metrics such as timestamps indicating when the packet was received by the network element 130 and when it was forwarded to a next hop may also be collected if they were required to be collected by the embedded INT instructions. Additionally, network element 130 may also add information regarding its queue size, and whether congestion was experienced when processing the received packet.

In some embodiments, INT instructions embedded in the packet header may require the network element 130 to compute one or more telemetry metrics based on the data stored in a packet that it receives. INT instructions may also define whether telemetry data is to be collected for every packet or for any alternative or a predetermined sequence of packets.

At Step 740, the collected telemetry data is sent to the collector that was designated in the INT header of the packet. In one embodiment, if the packet belongs to Flow-1, the INT header would have collector 1 (150)'s IP address embedded in the INT header and as such network element network element 130 will send collected telemetry data to Collector-1 (150) through link 270 (A). Likewise, if the packet belongs to Flow-2, the INT header would have collector 2 (160)'s IP address embedded in the INT header and as such network element network element 130 will send collected telemetry data to Collector-2 (160) through link 280 (A).

At step 750, once the packet is processed by network element 130, it is forwarded to the next hop network element 135 and then again to network element 140. As the packet follows it normal path, regardless of the path chosen, whether it is through network elements 130, 135, 140 or another path, the embedded header and INT instructions are used by each network element encountered along its path to take action based on the INT instructions and send telemetry data that matches the INT instructions to the designated collector.

Unlike the older traditional methods, network elements encountered along the path of the packet do not need to be configured with INT collector's IP address. The packet with its INT header embedded is self-sufficient and contains all the information needed by the network elements encountered to take appropriate action and send telemetry data back to the designated collector.

Likewise, if path changes occur, various embodiments presented do not require any changes to be made to collect network telemetry data from the new network elements encountered based on the new path change. The INT header of the packet that was embedded by the INT source contains all the information needed by the new network elements along the new path to take appropriate action and send telemetry data back to the designated collector. This approach eliminates the need to make configuration changes every time a path change or a new network element is used. As such, the problem described earlier, where a path change occurs, is solved by the self-contained packet that provides the information to all the new network elements encountered along the path.

Figure 8:
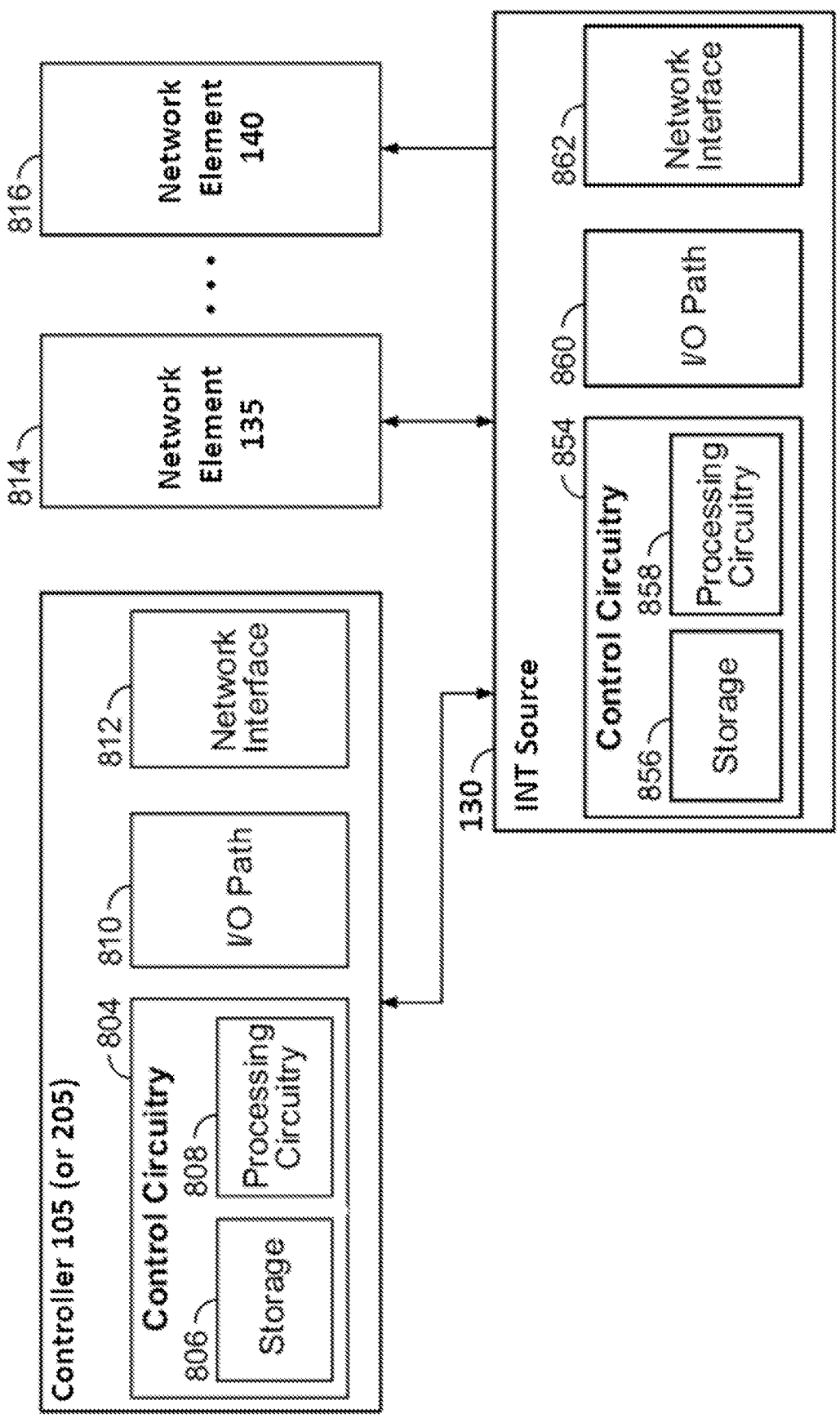
FIG. 8 shows components of a system for INT telemetry, in accordance with some embodiments of the disclosure.

FIG. 8 shows a diagram of illustrative devices of a system 800 that includes host management controller 105 (or network controller 205), INT source 125, and network elements 130-140. Network element 130 may be the same as network element 135-140 in FIGS. 1 and 2 and host management controller 105 (or network controller 205) may also be the same as depicted in FIGS. 1 and 2.

Host management controller 105 may receive and send data via an input/output (I/O) path 810. I/O path 810 is communicatively connected to control circuitry 804, which includes processing circuitry 808 and storage (or memory) 806. Control circuitry 804 may send and receive commands, requests, and other suitable data using I/O path 810. I/O path 810 may connect control circuitry 804 (and specifically processing circuitry 808) to one or more network interfaces 812, which in turn connect the host management controller 105 to other devices on the network (e.g., network elements 130-140).

Control circuitry 804 may be based on any suitable processing circuitry, such as processing circuitry 808. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 804 executes instructions stored in memory (i.e., storage 806). For example, the instructions may cause control circuitry 804 to perform packet forwarding, embedding of INT headers, storing and mapping watchlist, and other INT operations described in this document.

Memory 806 may be an electronic storage device that is part of control circuitry 804. As referred to herein, the phrase "electronic storage device" or "storage device" should be understood to mean any device for storing electronic data, computer software, instructions, and/or firmware, such as random-access memory, hard drives, optical drives, solid state devices, quantum storage devices, or any other suitable fixed or removable storage devices, and/or any combination of the same. Nonvolatile memory may also be used. The circuitry described herein may execute instructions included in software running on one or more general purpose or specialized processors.

Control circuitry 804 may use network interface 812 to receive and forward packets to other network devices 814-816 (which may include hardware similar to that of network element 130), e.g., over any kind of a wired or wireless network.

Memory 806 may include instructions for embedding packet headers with INT instructions and collector IP address, determining a match between an incoming packet and watchlist, mapping collector on a per-flow or per-tenant basis, and handling INT packets to collect and forward telemetry data as described above.

INT source 130 may include I/O path 860, network interface 862, and control circuitry 854 that includes processing circuitry 858 and storage 856. These elements may function similarly to elements 804-812 as described above. INT source 130 may be configured to receive packets and collectors 150 and 160 may be configured to receive telemetry data, such as copies of packets, meta data from packets from all networking elements in the network via network interface 862.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The invention claimed is:

1. A method of managing flow of telemetry data in an in-band telemetry (INT) capable network, the method comprising:
   receiving, by a management controller, flow parameters;
   identifying, by the management controller, an INT source based on the received flow parameters; and
   configuring, by the management controller, the INT source to determine a match between an incoming packet and a watchlist, and in response to determining a match, the INT source to:
     embed a header of the incoming packet with an INT header that includes IP address of a first collector, and
     embed the header of the incoming packet with INT instructions such that a network element receiving the incoming packet follows the INT instructions and forwards instructed INT telemetry data to the first collector.

2. The method of claim 1, wherein the flow parameters include source IP address, destination IP address, source port number, destination port number, MAC address, VLAN ID, VTEP IP, VXLAN ID, and protocol.

3. The method of claim 1, wherein the management controller is a host management controller or a network management controller.

4. The method of claim 1, wherein, regardless of a path taken by the incoming packet, the embedded INT header of the incoming packet provides telemetry instructions needed by a downstream network element, that has not been configured with INT telemetry collector IP address, to forward telemetry data to the first collector.

5. The method of claim 1, wherein the watchlist includes a list of desired flows to be monitored.

6. The method of claim 1, wherein, in response to not determining a match between the incoming packet and the watchlist, the INT source forwards the incoming packet without embedding the header of the incoming packet.

7. The method of claim 1, wherein the in-band telemetry (INT) capable network includes a plurality of tenants and each tenant is assigned a separate one or more collectors.

8. The method of claim 1, wherein INT source is selected from a group consisting of network application, a first network element, a network element along the path of the packet, switch, router, end-host networking stack, hypervisor, NICs, and send-side ToR.

9. The method of claim 1, further comprising,
   receiving, by the management controller, flow parameters for a second flow, wherein the flow parameters for the second flow include one or more parameters selected from a group consisting of a second source IP address, a second destination IP address, a second source port number, a second destination port number, a second MAC address, a second VLAN ID, a second VTEP IP, a second VXLAN ID, and a second protocol.

10. The method of claim 9, wherein the INT source to:
    embed the header of the incoming packet with the INT header that includes the IP address of the second collector, and
    embed the header of the incoming packet with INT instructions such that the network element receiving the incoming packet follows the INT instructions and forwards instructed INT telemetry data to the second collector.

11. The method of claim 1, wherein determining a match with the watchlist comprises:
  comparing the incoming packet's header with a plurality of parameters stored in the watchlist; and
  determining a match if the incoming packet header matches any one of the plurality of parameters stored in the watchlist.

12. A method for in-band telemetry (INT), the method comprising:
  receiving, by an INT source device, a plurality of flow parameters, wherein each flow parameter from the plurality of flow parameters relates to a desired flow to be monitored;
  generating, by the INT source device, a watchlist based on the received plurality of flow parameters;
  analyzing, by the INT source device, a packet received at an ingress port of the INT source device to determine a match between the received packet and any one of the plurality of flow parameters stored in the watchlist; and
  in response to determining a match, the INT source device to:
    embed a header of the received packet with an INT header that includes the IP address of a designated collector, and
    embed the header of the received packet with INT instructions such that a downstream network element receiving the packet follows the INT instructions and forwards instructed metadata to the designated collector.

13. The method of claim 12, wherein, in response to not determining a match, the INT source device forwards the received packet without embedding the header of the received packet.

14. The method of claim 12, wherein the INT source device receives the plurality of flow parameters from a management controller.

15. The method of claim 12, wherein, regardless of a path taken by the received packet, the embedded INT header of the received packet provides telemetry instructions needed by a downstream network element, that has not been configured with INT telemetry collector IP address, to forward telemetry data to the first collector.

16. A system for in-band telemetry (INT), the system comprising:
  a management controller;
  an INT source connected to the management controller through the in-band telemetry network; and
  the management controller having control circuitry configured to:
    receive flow parameters;
    identify the INT source based on the received flow parameters; and
    configure the INT source to determine a match between an incoming packet and a watchlist, and in response to determining a match, the INT source to:
      embed a header of the incoming packet with an INT header that includes IP address of a designated collector, and
      embed the header of the incoming packet with INT instructions such that a network element receiving the incoming packet follows the INT instructions and forwards instructed INT telemetry data to the designated collector.

17. The system of claim 16, wherein, in response to not determining a match between the incoming packet and the watchlist, the INT source forwards the incoming packet without embedding the header of the incoming packet.

18. The method of claim 16, wherein the management controller is a host management controller or a network management controller.

19. The system of claim 16, wherein the flow parameters include source IP address, destination IP address, source port number, destination port number, MAC address, VLAN ID, VTEP IP, VXLAN ID, and protocol.

20. The system of claim 16, wherein the network element is not configured by the management controller for INT telemetry.

* * * * *